United States Patent
Fischer et al.

(10) Patent No.: US 7,132,802 B2
(45) Date of Patent: Nov. 7, 2006

(54) METHOD FOR VARYING THE POWER CONSUMPTION OF CAPACITIVE LOADS

(75) Inventors: Klaus Fischer, Friedberg (DE); Josef Kreittmayr, Bobingen (DE)

(73) Assignee: Patent-Treuhand-Gesellschaft fur Elektrisch Gluhlampen mbH (DE)

( * ) Notice: Subject to any disclaimer, the term of this patent is extended or adjusted under 35 U.S.C. 154(b) by 81 days.

(21) Appl. No.: 10/810,664

(22) Filed: Mar. 29, 2004

(65) Prior Publication Data

US 2004/0207337 A1 Oct. 21, 2004

(30) Foreign Application Priority Data

Apr. 4, 2003 (DE) ................................ 103 15 474

(51) Int. Cl.
*H05B 37/00* (2006.01)

(52) U.S. Cl. ........................ 315/224; 315/307; 363/98

(58) Field of Classification Search ................ 315/307, 315/224

See application file for complete search history.

(56) References Cited

U.S. PATENT DOCUMENTS 5,960,207 A * 9/1999 Brown ........................ 713/300
6,731,078 B1 * 5/2004 Huber et al. ................ 315/307

* cited by examiner

*Primary Examiner*—David Vu
(74) *Attorney, Agent, or Firm*—Fitch, Even, Tabin & Flannery

(57) ABSTRACT

Method for varying the power consumption of capacitive loads, in particular compact fluorescent lamps which are operated using a phase-gating dimmer by a converter (step-up converter). According to the invention, in the case of a nonconducting dimmer (i.e. no system power supply to the load), the switch (T1) in the converter (step-up converter) is closed. In the case of a conducting dimmer (i.e. when a system voltage is applied to the load), the step-up converter operation takes place until a predetermined maximum voltage is reached across the smoothing capacitor of the load.

5 Claims, 5 Drawing Sheets

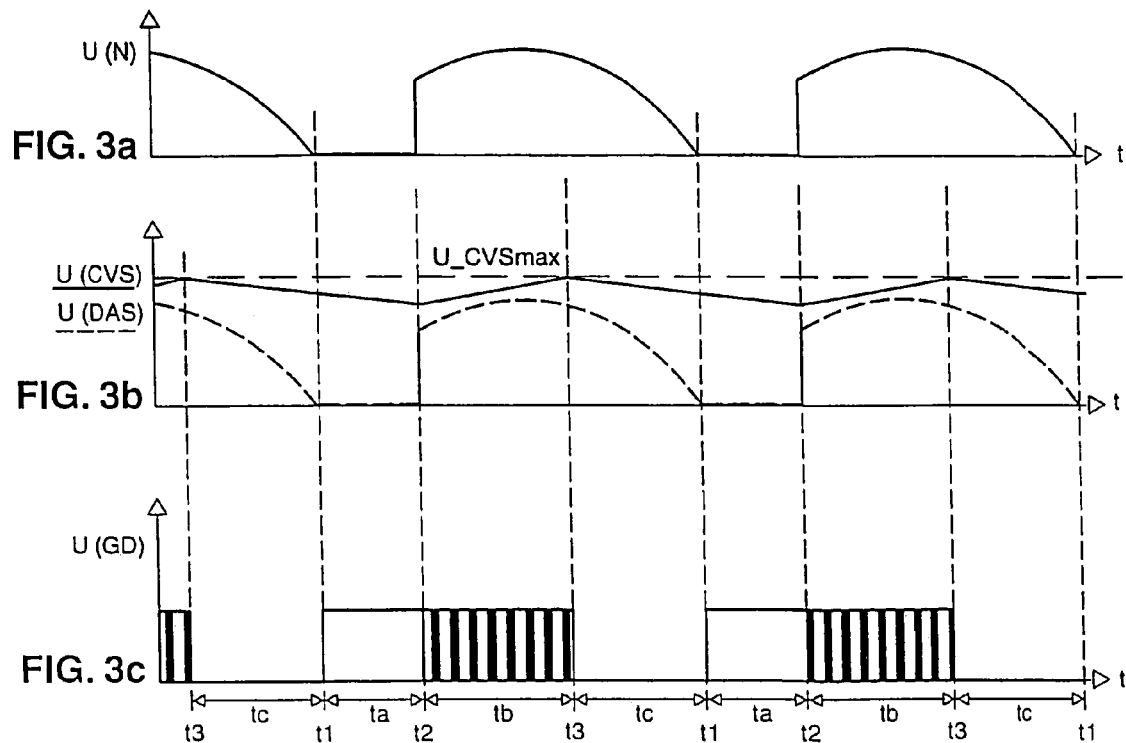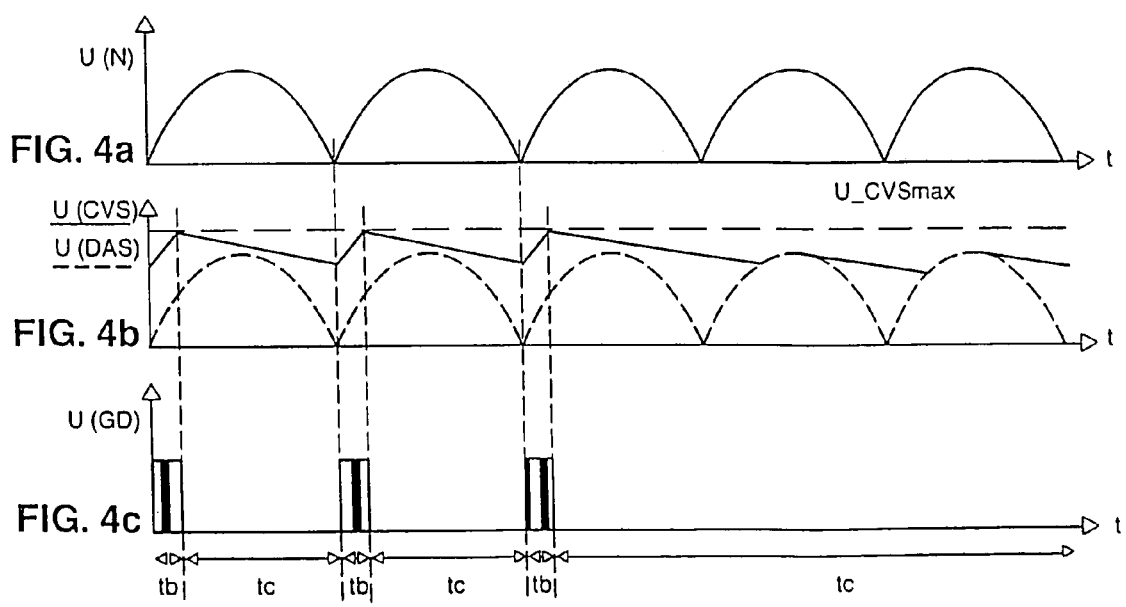

METHOD FOR VARYING THE POWER CONSUMPTION OF CAPACITIVE LOADS

TECHNICAL FIELD

The invention relates to a method and a control circuit for varying the power consumption of capacitive loads, which are operated on the AC voltage power supply system by connecting and disconnecting, at the system frequency, the system power supply in each system half-cycle, and in particular to a ballast for a lamp.

BACKGROUND ART

Lamps such as discharge lamps, in particular compact fluorescent lamps (CFL), are usually operated on the power supply system by means of a rectifier circuit for rectifying an AC voltage supply and charging a capacitor, which is often referred to as a smoothing capacitor. The term lamp used here relates in particular to the compact fluorescent lamps mentioned, but may also be understood to mean other lamps such as halogen lamps. The DC voltage present across the capacitor serves the purpose of supplying power to an inverter, which operates the compact fluorescent lamp. The invention generally relates to varying the power consumption of capacitive loads, the term "capacitive" in the case of lamp circuits meaning the so-called smoothing capacitor at the input of the inverter.

DISCLOSURE OF THE INVENTION

One object of the present invention is to specify an improved method and an improved control circuit for varying the power consumption of capacitive loads.

For this purpose, the invention provides a method for varying the power consumption of loads having a capacitive input on an AC voltage power supply system by connecting and disconnecting, at the system frequency, in each system half-cycle the system power supply, in that, as long as the system power supply is disconnected, a current path bridging the load inputs is created, and in that, when the system power supply is connected, a smoothing capacitor is charged by means of a converter until the voltage across the smoothing capacitor of the load reaches a predetermined maximum value. Converters will be understood below to mean devices which are suitable for converting an input voltage into an output voltage having a different time characteristic. In particular, these converters may be step-down converters or inverse converters or step-up converters.

The invention particularly relates to a circuit for carrying out said method and to an electronic ballast for a compact fluorescent lamp having such a circuit for operation using a phase-gating dimmer.

The inventors have used as a basis the knowledge that the possibilities for dimming or regulating the power in the case of capacitive loads are in need of improvement. When the system power supply is not constant, such as during dimming, for example, capacitive loads such as compact fluorescent lamps are susceptible to instabilities which appear in the form of disruptive flickering in the case of lamp operation.

It is true that, in the past, various pump circuits (known as circuits for reducing the line current harmonic components) have been used which allow for longer current flow angles, i.e. for the current to be drawn constantly, and thus improved dimming properties. However, such pump circuits require a large number of components. One disadvantage is the fact that the known pump circuits need to be designed such that, when the lamps are operated without dimmers, the line current harmonic components which occur do not exceed the relevant limit values. In addition, the pumping power of such pump circuits depends on the instantaneous voltage of the rectifier voltage intermediate circuit, as a result of which asymmetries of the dimmer result between successive system half-cycles, which result in the operated lamp flickering. In addition, no provision is made to ensure that the mentioned pumping power is kept at a sufficiently high value and, when operating using a dimmer, the smoothing capacitor is not recharged suddenly with high current peaks when the power breaker of the dimmer (triac) is closed, which can ultimately have negative effects on the life of the lamp.

The basic concept of the invention is to eliminate the mentioned instabilities and effects. For this purpose, in a first phase, in which the system power supply is disconnected, the method according to the invention, which relates in particular to the operation of capacitive loads using phase-gating dimmers, isolates a current path which bridges the inputs of the load. "Bridging" or "short-circuiting" is intended to mean that bridging occurs at least for low-frequency input voltages. Low-frequency means that, at such an input-voltage frequency, the inductive resistance in the converter (inductor) needs to be negligible compared with the timing resistance set in the dimmer. This low-resistance current path makes it possible to then charge, for example, the timing element of the power breaker in a dimmer even when no power is being supplied to the load. Once the system power supply has been connected, a converter operates until the voltage across the smoothing capacitor of the load reaches a predetermined maximum value. This makes it possible to prevent the smoothing capacitor of the lamp from being overloaded. The current path of the converter is in this case preferably designed such that on average over time the current is at least as great as the level of the holding current required for maintaining the system power supply.

One variant of the method provides for the predetermined maximum value for the voltage across the smoothing capacitor to be reduced when the time at which the system power supply is in each case connected falls below a predetermined minimum value. This has the advantage, in particular when operating using phase-gating dimmers, that, in the event of very high phase-gating angles, reactive currents and losses in the current-carrying components can be reduced.

The method according to the invention preferably detects, in a further step, whether the load is operated using a dimmer or whether it has a continuous system power supply. Continuous means that the AC voltage is applied to the input of the load permanently and constantly. For this purpose, the current path is permanently disconnected, i.e. the converter operation is deactivated.

The method according to the invention is carried out by a circuit according to the invention. This circuit has at least one current path which can be connected and disconnected and which bridges the inputs of the load. It is thus possible according to the invention, for example in the case of dimmer operation, for the dimmer timing element to be charged even when there is no power breaker (triac in the dimmer) connected. A control element is also provided which ensures that the voltage across the capacitive input of the load is detected and the current path is connected and disconnected accordingly. The detection preferably takes place by an image of the system voltage being produced by means of three resistors on the system side of the load upstream of a rectifier.

In addition, the circuit can evaluate a signal of the system power supply and produce a control signal on the basis of this signal which controls the power consumption of the load. This makes it possible to match the load operation to the variable system power supply.

In the present invention, the preferred form of the converter is a step-up converter. The current path in the circuit is preferably formed by a transistor which can be controlled by the control element. The step-up converter operates according to the invention once the system power supply has been applied to the load until the voltage across the smoothing capacitor of the load reaches a predetermined maximum value. This makes it possible to prevent overvoltages across the smoothing capacitor of the load, and for the life of the lamp overall to be positively influenced. In order to further reduce disruptive effects (for example the inductor of the dimmer), provision is made for the inputs of the load to be short-circuited upstream of the converter, thus bypassing the converter. This takes place according to the invention by means of an interface circuit which is connected between the rectifier and the converter and which produces a short circuit as long as no power is being supplied to the load on the system side. The interface circuit is in this case preferably decoupled from the converter by means of a decoupling diode such that no discharge processes can take place via the interface circuit, starting from the converter.

BRIEF DESCRIPTION OF THE DRAWINGS

The invention will be explained in more detail below with reference to several exemplary embodiments. In the drawing:

FIGS. 3a, 3b, 3c show a diagram which shows, as a function of time, a) the qualitative characteristic of the system voltage provided by the phase-gating dimmer, b) the qualitative characteristic of the voltage above that of the load, and c) the characteristic of the voltage signal at the control input of the transistor which is operated as a switch in the step-up converter;

FIGS. 4a, 4b, 4c show a further diagram which shows similar time characteristics of the variables mentioned in FIG. 3;

BEST MODE CARRYING OUT THE INVENTION

Figure 1:
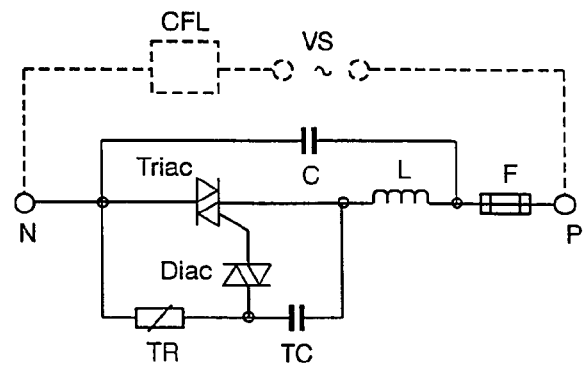
FIG. 1 shows a circuit arrangement for the operation of a load using a phase-gating dimmer.

FIG. 1 shows an example of the circuit arrangement for the operation of a load using a phase-gating dimmer. Shown is a circuit in which a load CFL is operated by an AC voltage/system power supply VS. The load CFL is supplied with power by this voltage source VS via a phase-gating dimmer (between the points N and P). Phase-gating dimmers provide a periodic system power supply to the load which is isolated in each half-period, with a time delay, by tripping a power breaker triac by means of a variable timing element diac, TR, TC. In addition to the power breaker triac and the timing element, which is formed from a diac, a capacitor TC and a variable resistor TR, there are generally further provided in the dimmer circuit a fuse F and, for radio interference suppression, also a capacitor C and an inductor L.

Figure 2:
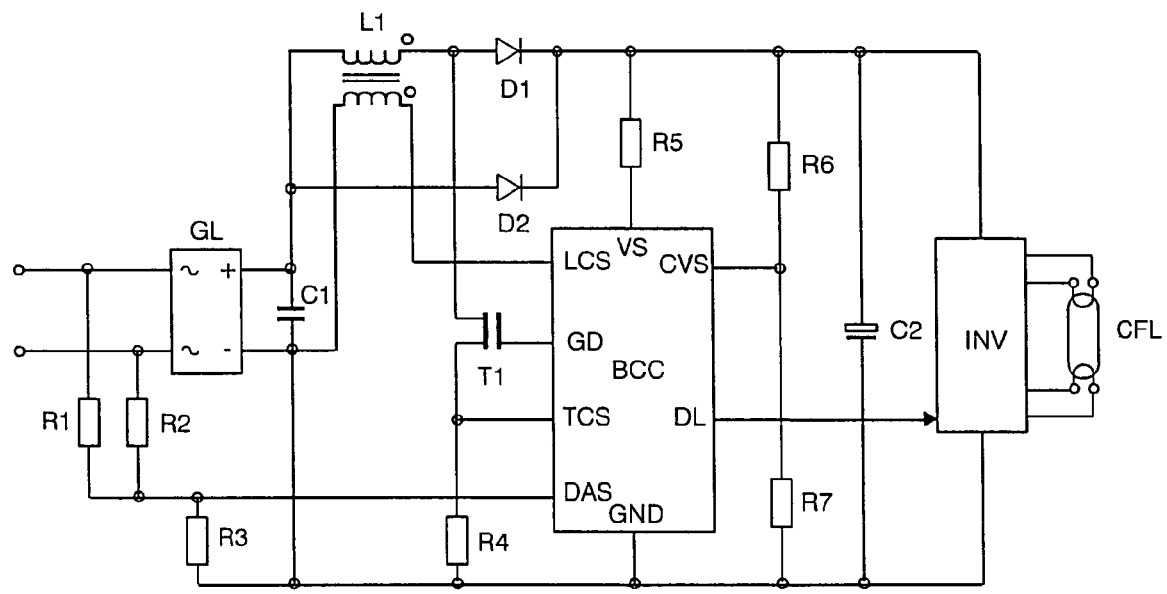
FIG. 2 shows an example of a circuit arrangement for realizing the method according to the invention.

The method according to the invention is based on the arrangement in terms of circuitry of a step-up converter which is formed in FIG. 2 as part of the integrated ballast of a compact fluorescent lamp (CFL) by the capacitor C1, the capacitor C2, the diode D1, the inductor L1 and the switch in the form of a transistor T1. The compact fluorescent lamp contains a rectifier GL, by means of which the capacitor C2 (i.e. the capacitive input of the load) is charged via the inductor L1. The capacitor C2 supplies power to a lamp CFL via an inverter circuit INV mentioned initially. A control circuit BCC is used to supply power to the capacitor C2 via the transistor T1 by driving the output GD.

The circuit operates as follows: The system AC voltage is converted in the rectifier GL to a pulsating DC voltage. The primary winding of an inductor L1 is connected in series with an additional secondary winding in the positive lead wire. The secondary winding can be used to detect the demagnetization of the inductor L1.

When closed, the transistor T1 provides for an increasing flow of current in the inductor L1 up to a settable value which is measured using a resistor R4 which is connected in series with the transistor. The current through T1 is detected by the control circuit BCC as the voltage drop across R4 via the input TCS and further processed.

Once the transistor T1 has opened, a diode D1 directs the current injected into the inductor L1 into a capacitor C2 until the inductor has completely demagnetized. This demagnetization is detected by the secondary winding on L1, which is connected to the input LCS of the control circuit BCC.

According to the present invention, the control circuit BCC which is described in more detail below controls, via the output GD, the closing and opening of the transistor T1. This control circuit is supplied with power, for example, via the resistor R5. Naturally, other circuits for providing sufficient supply voltage for the control circuit BCC may also be used.

The resistors R6 and R7 are used to detect the voltage across the capacitor C2, and, divided in accordance with the ratio R6/R7, this voltage is passed to the input CVS of the control circuit BCC.

The resistors R1, R2 and R3 are connected such that, for the purpose of detecting a phase-gating angle of the system voltage being supplied, an image of the instantaneously applied system voltage can be made available to the control circuit BCC at the input DAS.

On the output side of the rectifier, the zero crossings of the system voltage cannot be reliably detected owing to any residual voltages across filter capacitors (C1) or parasitic capacitances (for example in GL) which may be present. By connecting the two resistors R1 and R2 to the system side of the rectifier, the applied input voltage, in particular its zero crossings, can be detected independently of filter capacitors or radio interference suppression capacitors.

Via the output DL, the control circuit BCC makes available a signal, which is proportional in size to a phase-gating angle of a gated system voltage produced by an external dimmer and detected via R1, R2 and R3 or the input DAS. This signal may be used in a suitable inverter (not described in any more detail here) for controlling or regulating the lamp current and thus the lamp brightness as a function of a phase-gating angle set in the dimmer.

Reference is made to FIGS. 3a, 3b, 3c to explain the further operation of the circuit. Shown are the time characteristics of the system voltage U(N) across the resistor R3 (proportional to U(N)) which is provided by the phase-gating dimmer; of the voltage across the resistor R7 (proportional to U(C2)) or of the voltage U(DAS) across the input DAS, which is an image of the system voltage; and also of the voltage U(GD) present across the output GD for driving the transistor T1.

At the end of a system half-cycle, the voltage across the input DAS of the control circuit BCC becomes zero (time t1). Then, BCC closes the transistor T1 by means of the output GD. In the phase ta, in which there is no load current flowing through the transistor and thus through the resistor R4, since the triac contained in the dimmer which is present on the system side (cf. FIG. 1) has not yet been closed (phase gating), the transistor T1 remains permanently closed.

Owing to the closed transistor, the dimmable lamp according to the invention appears to the dimmer to be a low-resistance load such as an incandescent lamp, for example. The capacitor TC of the timing element present in the dimmer (formed by TR and TC, FIG. 1) can be charged via the current path GL, L1, T1 and R4 by means of the variable resistor TR of the timing element of the dimmer until the triac is triggered by the diac, although the lamp in the phase ta does not itself consume any power (charging current for the filter capacitor). Only the small current which is required for the operation of the timing element (TR, TC) in the dimmer therefore flows during ta. Practically all of the system voltage VS is present across the dimmer (voltage P-N), almost in the form of a reverse voltage.

At the moment at which the triac is triggered in the dimmer (time t2), a current can flow through the dimmer and the system voltage is applied to the input of the dimmable CFL, and the voltage across the dimmer (P-N) becomes almost zero. The physical properties of the triac require a minimum current (so-called holding current) to flow in order to keep the component in a conducting state without further trigger pulses. If the current value were to fall below this holding current, the triac would be extinguished again, and, when the internal timing element of the dimmer is set accordingly, a renewed trigger pulse could be supplied to the control input of the triac via the diac, as a result of which a renewed flow of current would be possible. This repeated triggering of the triac within a system half-cycle results in clearly visible flickering of the lamp, particularly if the above-described repeated triggering only takes place in every second system half-cycle.

According to the invention, the proposed circuit arrangement begins to operate at the time t2 as a known step-up converter. The components L1, T1 and R4 are in this case dimensioned such that the average current drawn by the dimmable CFL at the time tb is greater than the holding current for all triacs normally used in dimmers. This prevents the triac in the dimmer from being extinguished. At this time tb, the operation of the circuit arrangement as a step-up converter results in the smoothing capacitor C2 being charged, and the voltage U_C2 across C2 rises linearly.

At the time t3, the voltage U(CVS) which can be tapped off at the voltage divider R6/R7 reaches a predetermined maximum value U_CVSmax. This maximum value U_CVSmax results from the voltage level which can be applied to the capacitor C2, the withstand voltage of the switching elements contained in the inverter, a divider ratio R6/R7, the operating point UDC4 or USUB and the signal DL.

At this time t3, the operation of the circuit arrangement in the form of a step-up converter is ended according to the invention, the transistor T1 remains permanently open until the next zero crossing of the system voltage, at which point a new cycle begins. In this phase tc, the triac of the dimmer is extinguished, but this no longer has any effect on the operation of the CFL, since its smoothing capacitor C2 has been charged to a sufficient voltage level and the inverter arrangement INV or the lamp CFL can be supplied with power.

The step-up converter operation means that the filter capacitor is charged to the same value in each system half-cycle, even if asymmetries (slightly different phase-gating angles for the positive and negative half-cycle) occur in the dimmer. Flickering at a system-voltage frequency can therefore not occur according to the invention.

The invention may also be used if the load is operated without a dimmer. In conventional circuits, in this case the legal regulations with respect to the line current harmonic components cannot be complied with. This is because the step-up converter operation would begin immediately after each system zero crossing (no phase ta). The phase tb would then be complete so early that, at a phase angle of 90°, no more current would flow into the lamp. However, a corresponding standard EN61000-3-2 prescribes a current flow beyond 90°.

The control circuit BCC according to the invention detects whether a dimmer is present or whether the lamp is operated directly on the power supply system. FIGS. 4a, 4b, 4c schematically illustrate the transition into operation of the lamp with deactivated step-up converter, if no dimmer is present.

If no dimmer is present, the transistor T1 is, according to the invention, no longer permanently closed after a few system half-cycles (only the phase tc is now carried out), for which reason a direct capacitive charging current flows via the diode D2 from the power supply system into the capacitor C2. The dimensions of the capacitor must be the same as for the nondimmable lamps which are today available in order to comply with the abovementioned standard.

Figure 5A:
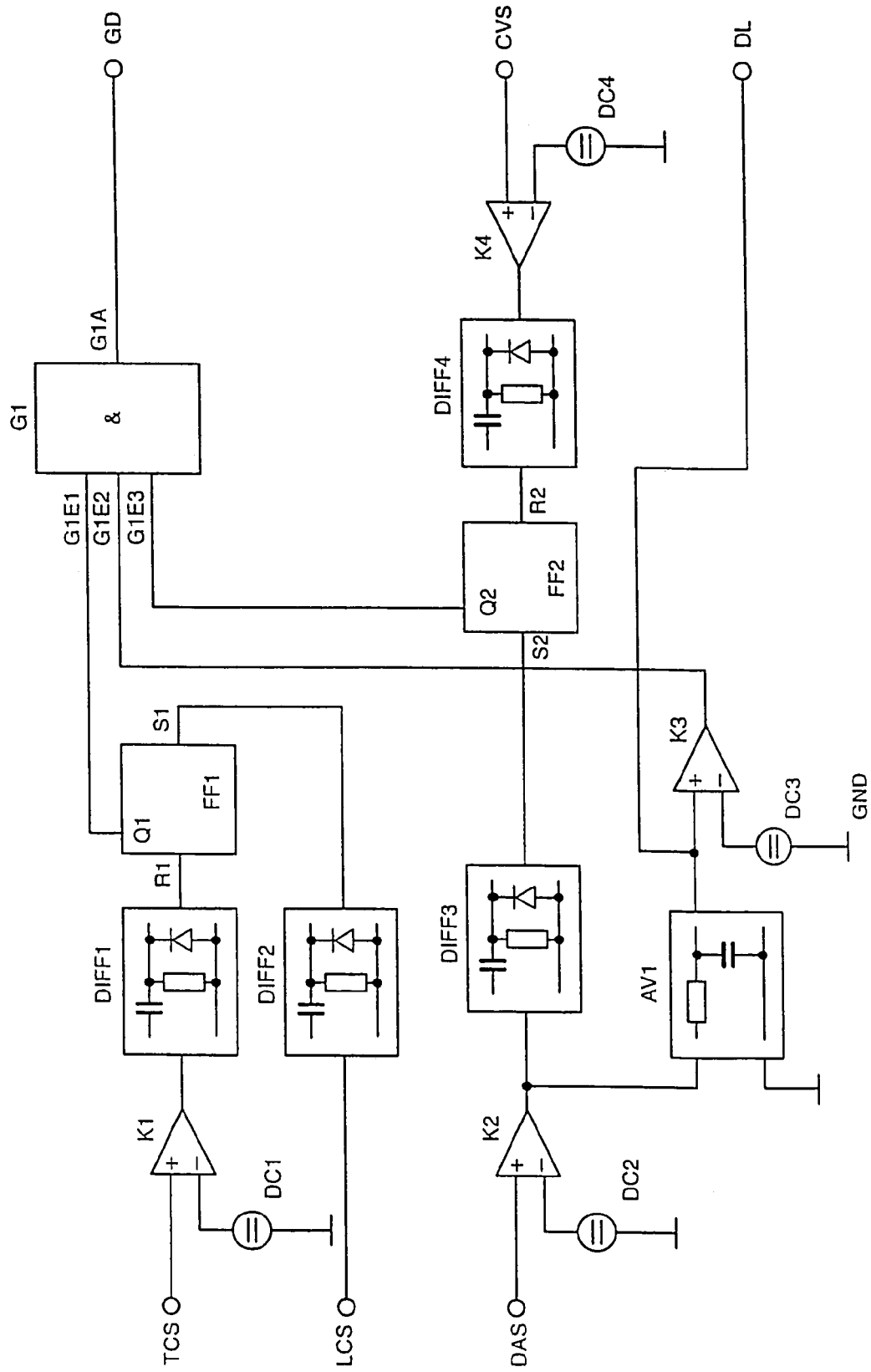
FIG. 5a shows an exemplary circuit for implementing the method according to the invention.

FIG. 5 shows an example of one circuit arrangement which implements the method according to the invention and operates as follows.

At the beginning of operation, the flipflops FF1 and FF2 are set such that their outputs Q1 and Q2 are logic "one". The output of the comparator K3 is at the outset likewise logic "one" since the capacitor contained in AV1 has not yet been charged and there is thus no voltage available as yet at the output of the low-pass filter AV1. These preconditions (G1E1=G1E2=G1E3="one") mean that the output G1A of the And gate G1 becomes logic "one", the output GD of the control circuit is thus likewise "one", and the transistor T1 is closed. As a result of the current which starts to flow through GL, L1, T1 and R4, the voltage across the input TCS, and thus across the positive input of a comparator K1 now rises. As soon as the voltage across TCS exceeds the predeterminable voltage DC1 across the negative input of K1, the output voltage of K1 rises sharply. By means of a differentiator DIFF1, this rise is converted into a short pulse which resets the flip-flop FF1 via the input R1 of said flipflop FF1, and the output Q1 becomes "zero". This results, by means of the input G1E1 of the And gate G1, in the transistor T1 being opened since GD likewise becomes "zero". Alternatively, it is possible to close the transistor T1 for a predetermined time. In place of the comparator, a corresponding timing circuit may be provided for this purpose.

The demagnetization of the inductor L1 is detected via the secondary winding on L1. The signal produced at this secondary winding is supplied via the input LCS to a differentiator DIFF2, at whose output a short pulse is provided at the moment at which the current in L1 becomes zero. This short pulse resets the flipflop FF1 via the input S1 (Q1 becomes "one"), which leads, by means of G1 and GD, to the transistor T1 being closed again.

According to the invention, this above-described operation of the circuit topology as a step-up converter can be influenced by the two inputs G1E2 and G1E3 of the And gate G1 such that the proposed method can be carried out.

At the beginning of operation, the output Q2 of the flipflop FF2 is at "one". As a result of the above-described operation of the circuit topology as a step-up converter (phase tb), the voltage across the smoothing capacitor C2 and thus across the input CVS of the control circuit rises.

If the voltage across CVS exceeds a predeterminable value DC4, the output of the comparator K4 switches from "zero" to "one". This change in state is converted by the differentiator DIFF4 into a short pulse which resets the flipflop FF2 via the input R2. As a result, Q2 becomes "zero", and the output of the And gate G1 likewise becomes "zero" as G1E3=0. By means of G1E3 and G1A, the transistor T1 remains reliably open (phase tc) until the flipflop FF2 is reset (time t1).

If the voltage across the input DAS (which is proportional to the voltage across the input of the CFL) becomes smaller at the end of a system half-cycle than a threshold voltage DC2 which can be set, the output of the comparator K2 switches from "one" to "zero". This change in state is converted by the differentiator DIFF3 into a short pulse which resets the flip-flop FF2 via the input S2. As a result, Q2 becomes "one", and the output of the And gate G1 can now become "one" again with corresponding input voltages across G1E1 and G1E2. The blocking of the gate G1 via G1E3 which is required in phase tc is canceled owing to the output Q2.

The output signal of the comparator K2 is also supplied to a low-pass filter AV1, whose output voltage is thus proportional to the phase-gating angle set in the dimmer. The smoothed signal at the output of the low-pass filter AV1 is provided at the output DL of the control circuit for the inverter INV in order to achieve a desired luminous flux.

The comparator K3 detects whether the CFL is operated using a dimmer. The voltage across the output of the low-pass filter AV1 is at a maximum when the entire system voltage is present across the CFL. In this case, the output voltage of AV1 is greater than a predeterminable threshold voltage DC3, and the output of the comparator is therefore "zero". Since the output signal of K3 is applied at the input G1E2 of the And gate G1, the output G1A of said And gate G1 is reliably "zero", and the transistor T1 cannot be closed via G1 or GD.

Each dimmer has a minimum phase-gating angle, even if it is set to 100% brightness. As a result, the output voltage of AV1 falls below the predeterminable value DC3, as a result of which the output of K3 is "one". In this state, the blocking of the gate G1 via G1E2 by means of the output of K3 is canceled if the CFL is operated using a dimmer.

In order to further improve the above-described method for dimming CFLs, provision may be made for the predeterminable maximum value U_CVSmax for the voltage across C2 to be slowly reduced at phase-gating angles greater than a likewise predeterminable value. In this case, account needs to be taken of the fact that a direct recharging of C2 via the diode D2 from the power supply system is reliably prevented. In each possible operating state, the voltage across C2 needs to be greater than the instantaneous value of the system voltage.

Figure 5B:
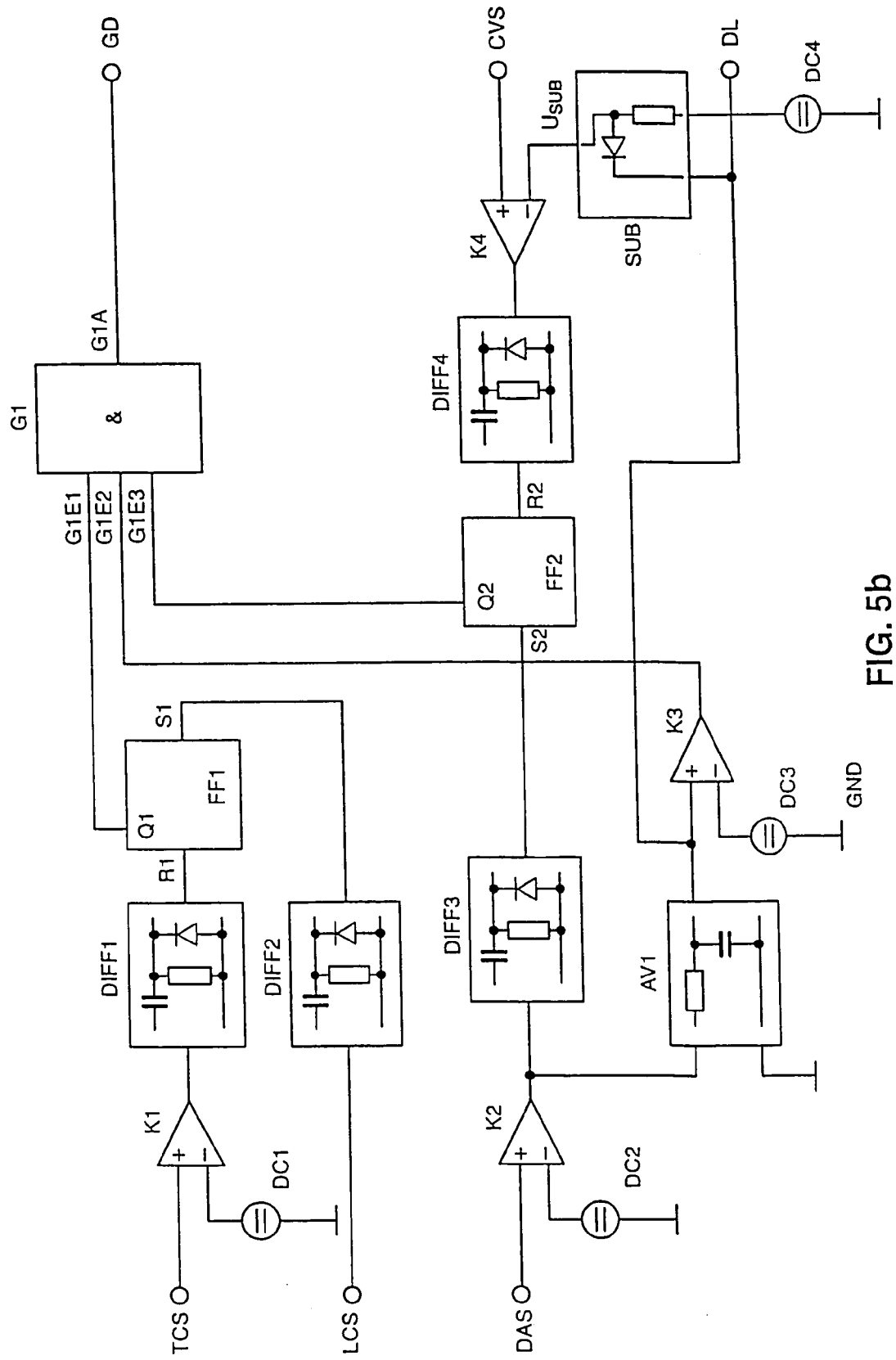
FIG. 5b shows a further exemplary circuit for implementing the method according to the invention.

A corresponding exemplary circuit arrangement for the control circuit is shown in FIG. 5b. Departing from the previous embodiment with reference to FIG. 5a, the comparator K4 is not supplied with a constant comparison variable DC4 but with a voltage which depends on the phase-gating angle (cf. FIG. 6).

In a subtractor SUB, a value which is dependent on the set gating angle is subtracted from the maximum value (predetermined by DC4) for the voltage across C2 at phase-gating angles greater than a predeterminable value. The signal DL can be used for this purpose since the output voltage of AV1 falls at increasing gating angles.

Figure 6:
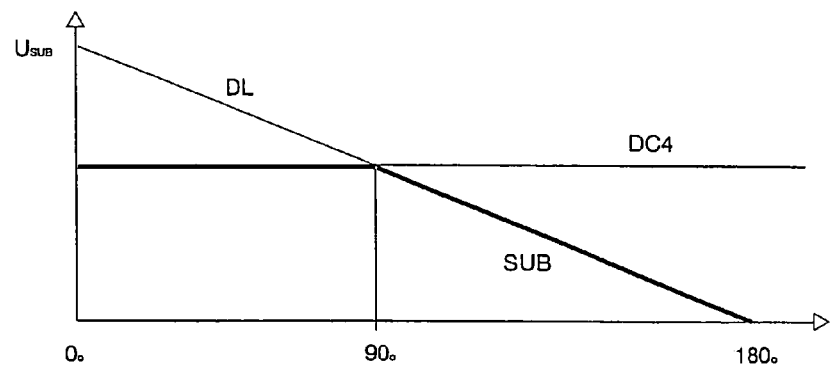
FIG. 6 shows a diagram which shows the characteristic of an output voltage used to regulate the power consumption of the load as a function of the phase-gating angle set in the phase-gating dimmer.

FIG. 6 shows, by way of example, the output voltage of the subtractor SUB as a function of the phase-gating angle when the voltage across C2 is reduced at phase-gating angles greater than 90°.

It is possible to determine the gating angle beyond which the reference value U(SUB), supplied to the comparator K4, for the maximum voltage U_CVSmax is reduced by varying the voltage DC4 and U(DL). The ratio R6/R7 can then be used to set the actual maximum voltage across C2. If, for example, the signal DC4 is reduced, the voltage U(SUB) is reduced only at phase-gating angles greater than 90°.

The above-described circuit arrangement should be viewed only as an example of the technical realization of the proposed method. Other circuits may also be used with which the described method can be applied.

The timing element can also operate according to the invention in the non-conducting state of the power breaker in the dimmer (i.e. if no system voltage is applied to the load). This means that the actual load is not present for the timing element when no power is being supplied. The circuit arrangement according to the invention in the load then represents a low-resistance current path. The tripping process of the power breaker in the dimmer is only defined by the timing resistor TR and the timing capacitor TC (cf. FIG. 1). It is thus possible to prevent, for example, phase shifts from occurring which can shift the tripping times in successive system half-cycles and can ultimately lead to undesired flickering for the load.

According to the invention, a (separate) interface circuit may be connected upstream of the step-up converter. The interface circuit is designed such that it bridges the transistor T1 and the inductor L1 in the phase ta such that the load is short-circuited with respect to the system terminals. This has the advantage that, when the triac is not triggered, the current path for charging the timing element in the dimmer does not pass via the inductor L1 and also the transistor T1 and the resistor R4 such that faults caused by the load or its electronic ballast, which would otherwise result in undesired flickering, can be prevented.

Figure 7:
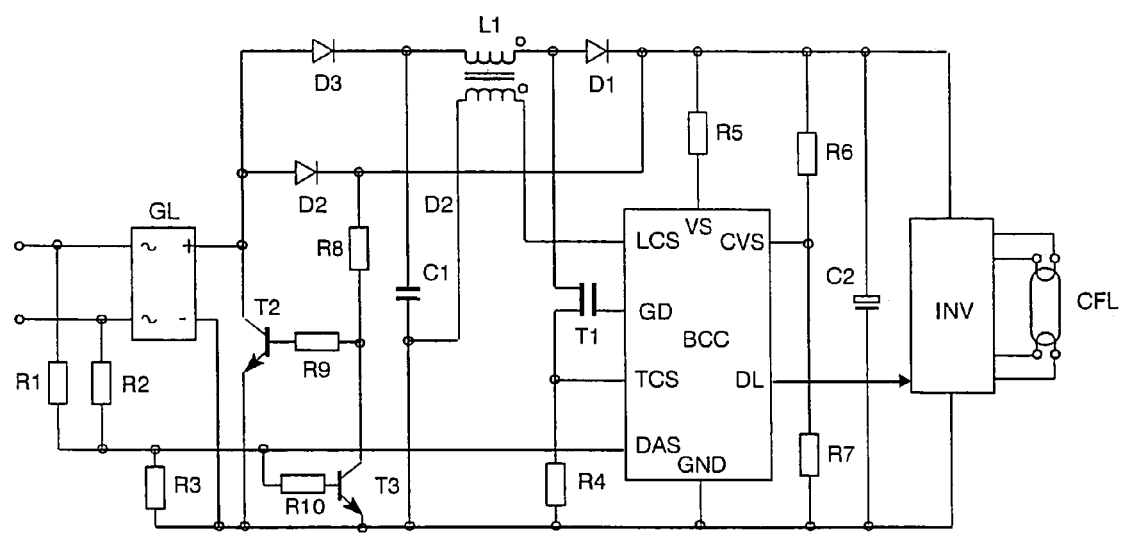
FIG. 7 shows a circuit diagram of a circuit according to the invention having an integrated interface circuit.

One example of the use of such an interface circuit is shown in FIG. 7.

The interface circuit according to the invention is formed in the example shown in FIG. 7 by the resistors R1, R2, R3, the diode D3, the resistors R8, R9, R10 and the transistors T2 and T3. The switching path of the transistor T2 runs in series with the decoupling diode D3 in parallel with the smoothing capacitor C1. The transistor T2 short-circuits the power supply inputs to the load. A second transistor T3 serves the purpose of closing and opening the transistor T2, and its collector (via a resistor R9) is connected to the base of the transistor T2. The switching path of the second transistor T3 in this case runs in parallel with the series circuit comprising the resistor R9 and the control path of the first transistor T2 (T3 therefore opens and closes T2). The first transistor can thus be opened by the other transistor being closed.

The operation of the circuit is as follows: The transistor T2 is closed according to the invention only in the phase ta and, when closed, forms a short circuit between the two system input terminals via the bridge rectifier GL. The polarity of the diode D3 prevents the transistor T2, when closed, from also short-circuiting the capacitor C1. The arrangement of the transistor T2 at the output of the bridge rectifier GL means that the input impedance of the load CFL both in the positive and the negative half-cycles of the system AC voltage (VS, see FIG. 1) is reduced to a minimum ("short circuit").

The resistors R1, R2 and R3 are used to form an image of the instantaneous input voltage of the circuit, and this is applied to the base of the transistor T3 via the resistor R10.

The arrangement of the resistors R1 and R2, which are connected according to the invention on the system side, ensures that the zero crossings of the system input voltage (polarity reversal) can be detected reliably and independently of any filter capacitances or else parasitic capacitances which may be present.

The transistor T2 is closed via the resistors R9 and R8 when the transistor T3 is open. When T3 is closed owing to a positive, sufficiently high voltage drop across R3 via R10, the transistor T2 is opened (time t2 in FIG. 3). The resistors R10 and R9 in this case serve the purpose of improving the switching behavior of T3 and T2.

The inverting function of T3 means that T2 is always closed during the time ta (cf. FIG. 3) at which the instantaneous value of the system AC voltage VS is present across the dimmer and the triac provided in the dimmer as a switching element is nonconducting. As soon as the triac in the dimmer is triggered (time t2 in FIG. 3), and as a result the instantaneous value of the system AC voltage VS is applied to the load CFL, T2 is opened, and the capacitor C1 is charged via D3 to the peak value of the input voltage of the load CFL.

What is claimed is:

1. In a power supply system comprising a rectifier, a converter, and a smoothing capacitor, wherein the rectifier has a first system-side input that is periodically connected to and disconnected from an AC voltage supply, a method for varying the power consumption of a load coupled to the smoothing capacitor, the method comprising the steps of:
    a) creating a current path that bridges the smoothing capacitor during periods when the rectifier circuit is disconnected from the AC voltage supply;
    b) charging the smoothing capacitor via the converter during periods when the first input of the rectifier is connected to the AC voltage supply and until such time as a voltage across the smoothing capacitor reaches a predetermined maximum value; and
    c) providing a control element operable to detect the voltage across the smoothing capacitor and to selectively connect and disconnect the current path, wherein the control element is coupled to a second input of the rectifier via a first resistor and a second resistor.

2. The method of claim 1, wherein:
   the converter is a step-up converter, the step-up converter including an inductor and a transistor that is controlled by the control element;
   the current path is guided via the inductor and the transistor of the step-up converter; and
   the step-up converter is designed to operate during periods when the first input of the rectifier is connected to the AC voltage supply and until such time as the voltage across the smoothing capacitor reaches the predetermined maximum value.

3. The method of claim 1, further comprising the step of providing an interface circuit operable to bypass the current path and an inductor within the converter during times when no power is being supplied to the load.

4. The method of claim 1, wherein:
   the converter is a step-up converter; and
   during operation of the step-up converter, the current path carries on average over time a current which corresponds at least to a holding current required for maintaining a conductive state of a triac.

5. In a power supply system comprising a rectifier, a converter, and a smoothing capacitor, wherein the rectifier has a first input that is periodically connected to and disconnected from an AC voltage supply, a method for varying the power consumption of a load coupled to the smoothing capacitor, the method comprising the steps of:
    a) creating a current path that bridges the smoothing capacitor during periods when the first input of the rectifier is disconnected from the AC voltage supply;
    b) charging the smoothing capacitor via the converter during periods when the first input of the rectifier is connected to the AC voltage supply and until such time as a voltage across the smoothing capacitor reaches a predetermined maximum value; and
    c) providing a control element operable to detect the voltage across the smoothing capacitor and to selectively connect and disconnect the current path; and
    d) providing an interface circuit operable to bypass the current path and an inductor within the converter during times when no power is being supplied to the load.

* * * * *